Patented Feb. 28, 1933

1,899,793

UNITED STATES PATENT OFFICE

RICHARD JOHN BULLOWS, OF BIRMINGHAM, ENGLAND, ASSIGNOR TO THE GEAR GRINDING COMPANY LIMITED, OF HANDSWORTH, BIRMINGHAM, ENGLAND

GEAR WHEEL GRINDING MACHINE

Application filed April 23, 1932, Serial No. 607,175, and in Great Britain October 14, 1931.

This invention relates to machines for grinding the teeth of gear wheels, particularly helical wheels, the machines being of the kind in which the tooth form is obtained by rolling the wheel relatively to a grinding disc. The object of the invention is to provide improved means for effecting the required rolling of the toothed wheel and the indexing of the same after each grinding operation.

The invention comprises the combination of a body part, a slide carried on the body part, a work spindle carried on the slide, fluid operated motors adapted respectively for reciprocating the slide and for imparting intermittent indexing movements to the work spindle, and means for imparting to the spindle the motion required for rolling the work piece relatively to the grinding disc, the whole forming a unit which can be pivotally or otherwise mounted on the bed of the machine in proper relationship with the grinding disc.

In the two accompanying sheets of explanatory drawings:—

Figure 1:
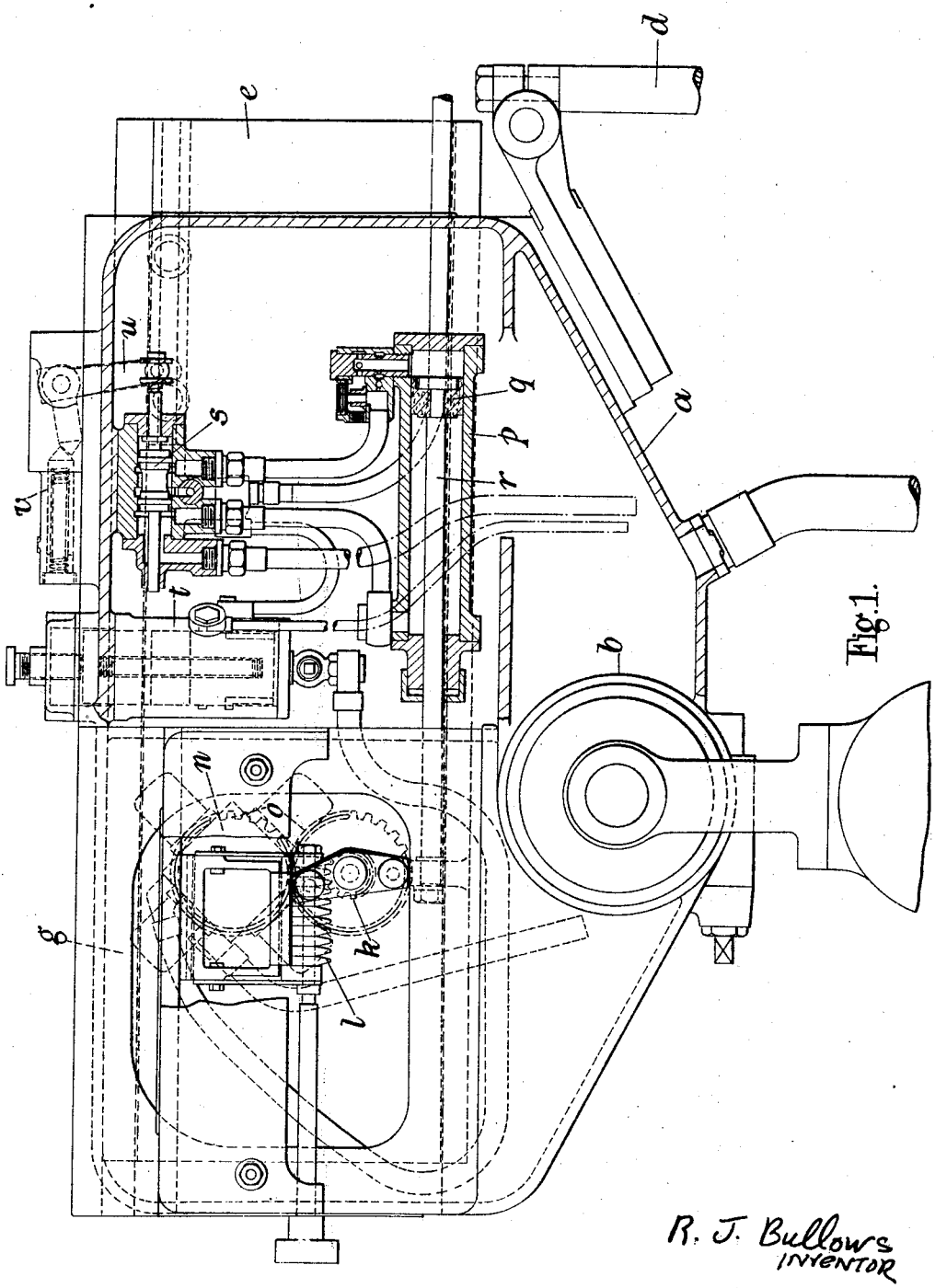
Figure 2:
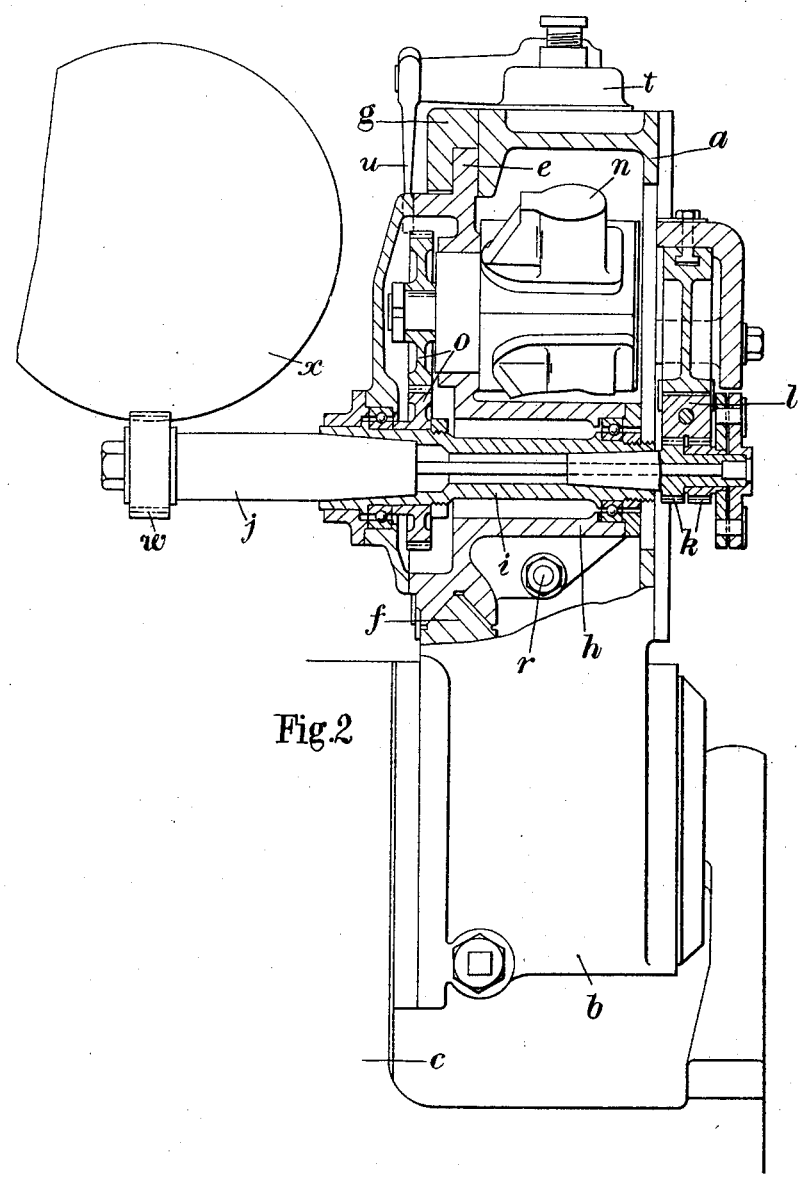

Figure 1 is a part sectional rear elevation and Figure 2 is a part sectional end elevation of a work operating unit constructed in accordance with this invention for a helical wheel tooth grinding machine.

In carrying the invention into effect as shown, I employ a body part $a$ in the form of a hollow rectangular box at the lower portion of which is provided a boss or trunnion $b$ whereby the body part can be mounted on the bed $c$ of the machine in a manner which allows of angular adjustment about a horizontal axis. Movement of the body about the said axis may be effected by a rod $d$ which is pivotally attached to one end of the body and is actuated by any convenient adjusting mechanism. One side of the body part is open, and at that side is arranged a slide $e$ in the form of a plate the plane of which is vertical. At its lower edge the slide is formed with a V-groove which co-operates with a complementary guide $f$ on the body part, and the upper edge of the slide, which is of rectangular section, bears against a side face of the body part and is held in position by a guide strip $g$. This disposition of the slide, and mode of supporting it, enables a light, rigid, and freely movable slide to be provided in a very convenient manner.

On the inner side of the slide is formed a boss $h$ which carries the work spindle $i$, the latter being preferably hollow and adapted for the engagement of a mandrel $j$. The work spindle extends through the hollow body part, and at the end opposite that to which the mandrel is secured, is arranged the indexing mechanism. This may consist of a pair of relatively rotatable toothed wheels $k$ both of which engage a stepped rack $l$ carried on the body part. Reciprocation of the spindle relatively to the body part by means of the slide causes the spindle to be rocked about its axis, and at the end of each movement one of the wheels passes out of engagement with a portion of the rack allowing an indexing movement to be given to the spindle by a device which exerts a constant torque on the spindle. The said device may comprise a fluid operated multicylinder motor $n$ which is connected to the work spindle by a pair of gear wheels $o$, and is carried in the body part aforesaid. This motor tends always to rotate the work spindle, but the latter is only free to receive a limited movement when one of the wheels engaging the rack passes out of engagement with the rack at the end of each operation.

Reciprocation of the slide is effected by a fluid operated motor consisting of a cylinder $p$ carried within the body part and fitted with a piston $q$ which is connected by a rod $r$ to the slide. Fluid is conveyed by pipes to and from a slide valve $s$ which controls the flow to the cylinder and some of the fluid is diverted through a reducing valve $t$ to the indexing motor. The slide valve $s$ which controls the slide operating motor is actuated by a tappet lever $u$ engaged by stops on the slide at the ends of the slide movements. This engagement serves to impart a partial movement to the lever against the action of a spring $v$, the completion of the movement being effected by the spring.

The reducing valve $t$ is also carried in the body part and consists of a cylinder and spring loaded piston, the latter being arranged to restrict or cut off the fluid supply of the indexing motor when the fluid pressure acting on the motor exceeds a predetermined amount.

By this invention, the whole of the mechanism required to effect the rolling of the work piece $w$ relatively to the grinding disc $x$, and the indexing movement, whereby a new tooth is brought into position for grinding at the end of each operation, is arranged to form a compact and convenient unit which can readily be mounted on the bed of the machine and adjusted to the required position relatively to the grinding disc.

The invention is not limited to the example described as subordinate details can be varied to suit different conditions.

Having thus described my invention what I claim as new and desire to secure by Letters Patent is:—

1. In gear wheel tooth grinding machines of the kind specified, the combination of a body part, a slide carried on the body part, a work spindle carried on the slide, fluid operated motors adapted respectively for reciprocating the slide and for imparting intermittent indexing movements to the work spindle, and means for imparting to the spindle the motion required for rolling the work piece relatively to the grinding disc, the whole forming a unit which can be pivotally or otherwise mounted on the bed of the machine in proper relationship with the grinding disc.

2. In gear wheel tooth grinding machines of the kind specified, means as claimed in claim 1, in which a hollow body part is used, the slide being arranged to form one side of the body part, and the operating mechanism being disposed within the body part, substantially as described.

3. In gear wheel tooth grinding machines of the kind specified, the combination of a body part, a vertical slide forming one side of the body part and supported on the body part at its upper and lower edges, a work spindle carried on the slide, fluid operated motors adapted respectively for reciprocating the slide and for imparting intermittent indexing movements to the work spindle, and means for imparting to the spindle the motion required for rolling the work piece relatively to the grinding disc, the whole forming a unit which can be pivotally or otherwise mounted on the bed of the machine in proper relationship with the grinding disc.

In testimony whereof I have signed my name to this specification.

RICHARD JOHN BULLOWS.